United States Patent [19]

Morgan

[11] Patent Number: 4,698,417

[45] Date of Patent: Oct. 6, 1987

[54] PRODUCTION OF OXY-METALLO-ORGANIC POLYMER

[75] Inventor: Peter E. D. Morgan, Thousand Oaks, Calif.

[73] Assignee: Rockwell International Corporation, El Segundo, Calif.

[21] Appl. No.: 831,955

[22] Filed: Feb. 24, 1986

[51] Int. Cl.$^4$ .................. C08G 79/08; C08G 79/10; C08G 79/00

[52] U.S. Cl. ..................................... 528/395; 528/425

[58] Field of Search ................................ 528/395, 425

[56] References Cited

U.S. PATENT DOCUMENTS

| | | | |
|---|---|---|---|
| 3,055,847 | 9/1962 | Woods et al. | 528/395 |
| 4,069,236 | 1/1978 | Hutchison et al. | 528/395 |
| 4,185,051 | 1/1980 | McKenna et al. | 528/395 |
| 4,514,555 | 4/1985 | Taniguchi et al. | 528/395 |
| 4,533,712 | 8/1985 | Taniguchi et al. | 528/395 |

FOREIGN PATENT DOCUMENTS 783679 9/1957 United Kingdom .
798186 7/1958 United Kingdom .

Primary Examiner—Harold D. Anderson
Attorney, Agent, or Firm—H. Fredrick Hamann; Craig O. Malin; Max Geldin

[57] ABSTRACT

A process for producing novel oxy-metallo-organic, e.g. oxy-alkoxy, polymers is disclosed which comprises heating a metallo-organic compound, e.g. an alkoxide of a metal selected from the group consisting of aluminum, titanium and zirconium, and mixtures thereof, such as aluminum butoxide, under reflux in inert atmosphere and in the absence of any solvent, and polymerizing the metallo-organic compound. The resulting polymer can be in the form of a viscous liquid, a glass or an amorphous powder, and can function as intermediates or precursors for production of ceramics, ceramic composites, fibers and films.

15 Claims, 2 Drawing Figures

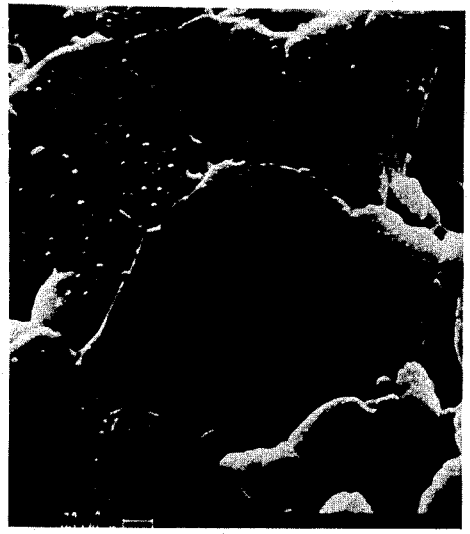 
FIG. IA          FIG. IB

PRODUCTION OF OXY-METALLO-ORGANIC POLYMER

BACKGROUND OF THE INVENTION

The present invention relates to the production of oxy-metallo-organic polymers, and is particularly concerned with a process for producing oxy-alkoxy polymers of aluminum, titanium or zirconium, or mixtures thereof, as intermediates or precursors for conversion thereof to ceramics, fibers and films.

Polymers such as polycarbosilanes and polysilanes are now considered as precursors to covalent ceramics, such as silicon carbide and silicon nitride. Also, polymers with silicon-oxygen backbones, the silicones, are well known.

The article of G. Carturan, V. Gottardi, and M. Graziani, "Physical and Chemical Evolutions Occurring in Glass Formation from Alkoxides of Silicon, Aluminum and Sodium," J. Non-Crystalline Solids 29, 41–48 (1978), discloses dissolving the alkoxides $Si(OEt)_4$, $Al(OsBu)_3$ and $NaOCH_3$, employing a major proportion of silicon ethoxide, in an ethanol-methanol solvent mixture and maintaining the mixture at reflux temperature, of the order of about 75° C. The result is an undistillable oil which turns to a gel on standing in air, by the hydrolysis of alkoxide groups with air and moisture. Upon heating the gel to temperature up to about 650° C., the gel was transformed to a glass. The glass was obtained without the formation of crystalline solids.

The article of D. C. Bradley and M. M. Faktor, "The Pyrolysis of Metal Alkoxides," Trans. Farad. Soc. 55, 2117 (1959) discloses the hydrolytic decomposition of zirconium tetra tert. - amyloxide at 218° C. to zirconium oxide. When employing tertiary organic alkoxides, neither intermediate oxy-alkoxides nor polymers were obtainable.

SUMMARY OF THE INVENTION

One object of the present invention is the production of novel oxy-metallo-organic polymers, particularly oxy-metallo-alkoxy polymers, which can be used as precursors for conversion with high yield to ceramics.

Another object is the provision of novel procedure for producing such polymers.

A still further object of the invention is to provide a process for the synthesis of oxidic polymers of various elements, particularly aluminum, titanium or zirconium, or mixtures thereof, having compositions intermediate between oxides and alkoxides (oxy-alkoxides), and the novel polymers produced by such process.

The above objects are achieved according to the invention and an oxy-metallo-organic polymer is produced by a process which comprises heating in inert atmosphere a metallo-organic compound, e.g. an alkoxide of a metal selected from the group consisting of aluminum, titanium and zirconium, and mixtures thereof, substantially at reflux temperature, in the absence of any solvent, i.e. without employing a solvent as medium for the reaction, and recovering an oxy-metallo-organic polymer, e.g. an oxy-alkoxide polymer. In the reaction process, a mixture, primarily of alkenes and alcohols, is evolved.

In the above reaction, a thermolysis of the metallo-organic compound, e.g. the above liquid alkoxide or mixed alkoxides, takes place at relatively high temperature, for a period sufficient to produce a polymer which can be in the form of an oil, a viscous liquid, a glass or an amorphous powder.

The resulting polymers can function as precursors or intermediates in the production of ceramics, by firing or sintering the polymer, e.g. oxidatively in air.

Fibers, films and spherical particles can be made, both from the molten polymers, e.g. oxy-alkoxides, and from organic solutions of the polymers.

DESCRIPTION OF THE DRAWING

FIGS. 1A and 1B of the drawing both show SEM (scanning electron microscope) micrographs of the structure of the ceramic produced according to Example V below, showing fine grains or particles of $ZrO_2$ within grains of $Al_2O_3$. FIG. 1B is taken at a much higher magnification than FIG. 1A.

DETAILED DESCRIPTION OF PREFERRED EMBODIMENTS

The starting material of the invention process is a single or mixed metallo-organic compound, preferably wherein the metal is Al, Ti or Zr, or mixtures thereof, such as compounds of the formulae $Al(OR)_3$, $Ti(OR)_4$ and $Zr(OR)_4$. In addition to the metallo-organic compounds of Al, Ti and Zr, the organic alkoxides of other elements including Mg, Be, Na, K, Li, RE (Rare earth), Y, Si and B, and mixtures thereof, can also be employed as starting material. Examples of the Rare earth elements are Ce, Nd, Pr, Sm and Gd. Thus, any suitable oxy-metallo-organic compound can be employed, containing an element or metal which is not easily reduced under the reaction conditions.

The R group of the above organic oxides can be any suitable organic radical, including alkyl and aryl. In one example of practice, R can be an alkyl group, so that the above starting materials are alkoxides. Thus, R can be an alkyl group ranging broadly from 1 to 30 carbon atoms, preferably from 3 to 6 carbon atoms. Hence, most desirably, the starting material is a propoxide or a butoxide of aluminum, titanium, or zirconium, e.g. the alkoxides $Ti(O-nC_4H_9)_4$, $Al(O-sC_4H_9)_3$ and $Zr(O-nC_3H_7)_4$. R can be other alkyl groups, either saturated or unsaturated, and polyfunctional groups such as glycol and acetyl acetonate groups, and the various R groups can have functional substituents such as $-OH$, $-NH_2$ and halogen such as Cl groups. Due to their availability and special stabilities in certain circumstances, the partially substituted acetyl acetonates have particular utility in this polymerization reaction.

R can also include aryl groups such as phenyl, phenyl alkyl such as tolyl, and naphthyl, and aryl groups containing various substituents such as hydroxyl, amino and halogen, e.g. chlorine.

However, R groups which exceedingly readily detach from the metallo-organic during the reaction may be unsuitable, e.g. the t-butyl groups as disclosed in the above noted Bradley et al article.

The reaction is carried out by heating under reflux single or mixed organic metal oxides of the types defined above, such as alkoxides. In the case of the preferred propoxides or butoxides of aluminum, titanium or zirconium, these are in the form of liquids. The latter reactants are refluxed in dry inert atmosphere, e.g. nitrogen or argon, at up to about 300° C. A mixture, primarily of alkenes and alcohols, together with traces of aldehydes, corresponding to the original R group, is permitted to be evolved during the reaction. This is based on infra-red analysis, nuclear magnetic resonance and boiling point data. The liquid in the reaction vessel becomes progressively more viscous as the reaction proceeds, and with sufficient release of the distillate, may solidify to a glass or amorphous powder. If the reaction is stopped before solidification and cooled, a glassy, resinous solid may result. It is observed that the viscous liquids at about 300° C. persist up to about the half way stage of transformation of the alkoxide to the oxide polymer.

The novel oxy-alkoxy polymers produced in the invention process have a general schematic structure containing the structural unit type

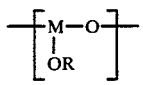

where R is an organic radical, e.g. having the values noted above, such as alkyl or aryl, particularly alkyl, e.g. propyl or butyl, and M is an element selected from the group consisting of Al, Ti, Zr, Mg, Be, Na, K, Li, RE (Rare earth), Y, Si and B. Preferably, M is a metal selected from the group consisting of Al, Ti and Zr. The preferred polymers accordingly are the oxy-alkoxy polymers of Al, Ti or Zr.

It should be noted that unlike carbon, whose valence of 4 is almost always accompanied by a coordination of 4 in polymers, it is recognized that for metal-oxygen linkages, the coordination to oxygen may be higher than the valence, e.g. aluminum commonly will have a coordination of 6 and Zr, 8.

In studies to date, no change of the R group, e.g. no degradation or isomerization thereof, during the polymerization reaction has been observed by NMR (nuclear resonance techniques). In some cases, however, such changes may occur, and may sometimes be advantageous.

Since the oxy-metallo-organic polymers, particularly the oxy-metallo alkoxy polymers, produced according to the invention process, e.g. in the liquid or glassy or amorphous powder form, are already about half way to formation of oxides, they can serve as intermediates for oxide matrices for ceramic composites, which can be produced by hot or cold pressing, or hot isostatic pressing, followed by sintering, and by other methods well known in the ceramics art. A further potential use of the invention polymer would be as an extrusion aid polymer in the production of bars, tubes, and the like, of oxides, replacing the purely organic polymers presently employed. Further, fibers, films and spherical particles can be made, both from the molten polymers, and from organic solutions thereof.

It will be noted that addition of minor modifying elements can be made to the metallo-organic starting material to control the finished ceramic morphology such as strength and toughness or for grain growth control or for specialized aliovalent doping effects for electronic applications as is presently conventionally done in ceramic technology. For example, the addition of Y as a minor element to Zr as the metal of the metallo-organic compound, for transformation toughening, or the addition of Mg as a minor element to Al as the metal of the metallo-organic compound for grain growth inhibition. Such minor elements are generally employed in small amounts, e.g. 0.1 to 10% by weight of the metallo-organic compound.

The following are examples of practice of the invention.

EXAMPLE I

Al(O—sC$_4$H$_9$)$_3$ is stirred and heated slowly in a pyrex flask under argon gas to about 300° C. over a period of about 4 hours. A reflux condenser drips the unreacted alkoxide back into the flask but allows alkenes and alcohols to distill off at about 50°–150° C.

The contents of the flask slowly thicken until an oil, viscous liquid or a solid glass is produced as the end product, as desired. The final composition of the polymer is approximately AlO$_{0.93}$(O—sC$_4$H$_9$)$_{1.15}$ containing 40 w/o (weight percent) Al$_2$O$_3$.

The procedure can be stopped at intermediate points during the period of reaction, to obtain more or less viscous liquids which can be spun to fibers, made into films or used as extrusion aids. The products are quite soluble in alcohols, ketones, hydrocarbons and chlorinated hydrocarbons.

EXAMPLE II

The procedure of Example I is followed except that the alkoxide starting material is Al(OC$_3$H$_7$)$_2$(C$_6$H$_9$O$_3$), aluminum di(isopropoxide)acetoacetic ester chelate.

Propene and isopropanol are the main products distilled off until the alkoxide ester polymerizes to a thick viscous oil having a composition of approximately AlO$_{1.16}$(C$_6$H$_9$O$_3$)$_{0.69}$ containing 32% by weight Al$_2$O$_3$. On cooling, the viscous oil solidifies to a deep yellow-orange to red-brown glassy solid.

EXAMPLE III

The procedure of Example I is substantially followed, except that titanium tetra n-butoxide, Ti(O—nC$_4$H$_9$)$_4$ is employed as the alkoxide. Upon heating this liquid slowly up to about 300° C. for a period of about 2 hours a solid polymer (glass) is produced with a formula approximately TiO$_{1.35}$(O—nC$_4$H$_9$)$_{1.3}$ with 49 w/o TiO$_2$. Upon further heating at 300° C. for a total period of 4 hours, anatase, TiO$_2$, begins to precipitate. This is generally undesirable and polymerization is normally stopped before this occurs.

EXAMPLE IV

The procedure of Example I is essentially followed except that the alkoxide starting material is zirconium tetra n-propoxide.

A polymer is obtained having the approximate composition ZrO$_{1.35}$(O—nC$_4$H$_9$)$_{1.3}$ with 40 w/o ZrO$_2$.

EXAMPLE V

A mixture ratio of about 9 mole Al(O—sC$_4$H$_9$)$_3$ and about 1 mole Zr(O—nC$_3$H$_7$)$_4$ is prepared and the liquid is heated by procedure similar to Example I up to a reflux temperature of about 300° C. for a period of about 4 hours, to produce a mixed oxy-alkoxy copolymer of aluminum and zirconium.

The resulting polymer (glassy amorphous powder) is ground and can then be formed into a desired shape by hot isostatic pressing, and the resulting composite shape is then sintered for solidification and densification at sufficiently high temperature, e.g. about 1500°–1700° C., to produce a 90 v/o (volume percent) Al$_2$O$_3$, 10 v/o ZrO$_2$ ceramic composite, wherein alumina grains contain within them fine zirconia grains of only 0.1μ (micron) grain size, as shown in FIGS. 1A and 1B of the drawing. Ceramics having high strength and toughness have microstructures of this type, as shown by the SEM micrographs in FIGS. 1A and 1B of the drawing.

It is noted that the process and product of the present invention distinguishes over the disclosure of the above Carturan et al reference in several important respects. Thus, in the process of this application, only oxy-metallo-organic compounds, particularly alkoxides of aluminum, titanium or zirconium, or mixtures thereof, usually in the form of liquids, are employed as starting material, and the reaction is carried out in the absence of any organic solvent medium and at relatively high reflux temperature of the starting material liquids, e.g. about 300° C. and in an inert atmosphere, whereas the Carturan et al process is carried out by dissolving the starting materials thereof in an ethanol-methanol solvent solution and heating at reflux temperature, which is a relatively low temperature of only about 75° C. in such organic solvent solution.

Further, the reaction of the present application is essentially a thermolysis reaction whereas the Carturan et al reaction ends as a hydrolysis reaction. In the thermolysis reaction carried out according to the present invention oxy-metallo-organic polymers, particularly oxy-metallo-alkoxy polymers of relatively high molecular weight are formed, as evidenced by viscosity characteristics, obtained after a period of heating, whereas in Carturan's air hydrolysis reaction a gel is formed, which upon further heating then forms a glass.

From the foregoing, it is seen that the invention provides a unique process for producing oxy-metallo-organic polymers, especially oxy-metallo-alkoxy polymers, which are particularly suited as intermediates or precursors by virtue of ready formability, for production of ceramics, e.g. as by oxidative sintering of the polymers, or for production of fibers, films and other shapes. The process is preferably carried out using primarily liquid alkoxides of aluminum, titanium or zirconium, or mixtures thereof, as starting material, simply by heating such liquids at reflux temperature for a relatively short period of time.

It will be obvious that since the polymers of the invention are about half-way to oxides, the yield of oxide from the polymers is high, and higher than usually achieved from other decomposable materials, including alkoxides themselves.

Since variations and modifications of the invention without departing from the invention concept will occur to those skilled in the art, the invention described herein is not to be taken as limited except by the scope of the appended claims.

What is claimed is:

1. A process for producing an oxy-metallo-alkoxy polymer which comprises:
heating an n or s alkoxy-metallo-organic compound of an element selected from the group consisting of Al, Ti, Zr, Mg, Be, Y, Si, B, and a rare earth element, and mixtures thereof, substantially at reflux temperature, in the absence of an solvent, thereby polymerizing said n or s alkoxy metallo-organic compound, and
recovering an oxy-metallo-alkoxy polymer.

2. The process of claim 1, wherein the reaction is a thermolysis reaction in an inert atmosphere and is carried out for a period sufficient to produce a polymer product, in the form of an oil, a viscoms liquid, a glass or an amorphous powder.

3. The process of claim 1, wherein said element is selected from the group consisting of Al, Ti and Zr.

4. The process of claim 1, wherewn said n or s alkoxy metallo-organic compound is selected from the group consisting of $Al(OR)_3$, $Ti(OR)_4$, $Zr(OR)_4$, and mixtures thereof, where R is alkyl or aryl.

5. The process of claim 4, wherein R is an alkyl group of from 1 to 30 carbon atoms.

6. The process of claim 4, wherein R is an alkyl group of from 3 to 6 carbon atoms.

7. The process of claim 4, where R is an acetyl acetonate group.

8. The process of claim 1, wherein a small amount of a minor modifying element is added to the n or s alkoxy-metallo-organic compound to control finished ceramic morphology, strength, toughness and electronic properties.

9. A process for producing an oxy-metallo-alkoxy polymer, which comprises
heating a liquid selected from the group consisting of an n or s propoxide and butoxide of a metal selected from the group consisting of aluminum, titanium and zirconium, and mixtures thereof, in the absence of any solvent, under reflux for a time sufficient to polymerize said metal propoxide or butoxide,
distilling off a mixture of alkenes and alcohols, and
recovering an oxy-metallo-alkoxy polymer.

10. The process of claim 9, said heating being carried out at about 300° C. in an inert atmosphere.

11. The process of claim 9, said polymer being in the form of an oil, a viscous liquid, a glass or an amorphous powder.

12. The process of claim 9, wherein said heating a liquid comprises heating aluminum butoxide.

13. The process of claim 9, wherein said heating a liquid comprises heating titanium butoxide.

14. The process of claim 8, wherein said heating a liquid comprises heating zirconium propoxide.

15. A process for producing an oxy-metallo-alkoxy polymer, which comprises:
heating a compound selected from the group consisting of $Al(O-sC_4H_9)_3$, aluminum di(isopropoxide) acetoacetic ester chelate, $Ti(O-nC_4H_9)_4$, and $Zr(O-n\ C_3H_7)_4$, and mixtures thereof, in the absence of any solvent, under reflux for a time sufficient to polymerize by thermolosis said compound to an intermediate oxy-alkoxide,
distilling off a mixture of alkenes and alcohols, and
leaving an oxy-metallo-alkoxy polymer.

* * * * *